(12) United States Patent
Takebe (10) Patent No.: US 8,806,184 B2
(45) Date of Patent: Aug. 12, 2014

(54) BRANCH PREDICTION METHOD AND BRANCH PREDICTION CIRCUIT PERFORMING THE METHOD

(75) Inventor: Yoshimasa Takebe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 401 days.

(21) Appl. No.: 13/052,197

(22) Filed: Mar. 21, 2011

(65) Prior Publication Data

US 2011/0238965 A1 Sep. 29, 2011

(30) Foreign Application Priority Data

Mar. 25, 2010 (JP) .................................. 2010-069910

(51) Int. Cl.
*G06F 9/30* (2006.01)

(52) U.S. Cl.
USPC ............................ 712/238; 712/239; 712/241

(58) Field of Classification Search
USPC ......................................... 712/238, 239, 241
See application file for complete search history.

(56) References Cited

U.S. PATENT DOCUMENTS

| | | | | |
|---|---|---|---|---|
| 5,842,008 | A | * | 11/1998 | Gochman et al. ............. 712/240 |
| 6,170,053 | B1 | * | 1/2001 | Anderson et al. ............. 712/240 |
| 6,256,728 | B1 | * | 7/2001 | Witt et al. ..................... 712/236 |
| 6,532,534 | B1 | | 3/2003 | Sunayama et al. |
| 2006/0095744 | A1 | | 5/2006 | Furuya |
| 2008/0229052 | A1 | * | 9/2008 | Ozer et al. .................... 711/202 |
| 2009/0249048 | A1 | * | 10/2009 | Schuler et al. ............... 712/238 |
| 2010/0262813 | A1 | * | 10/2010 | Brown et al. ................. 712/240 |

FOREIGN PATENT DOCUMENTS

| | | |
|---|---|---|
| JP | 08-241198 | 9/1996 |
| JP | 11-96005 A | 4/1999 |
| JP | 2000-172503 | 6/2000 |
| JP | 2006-072926 | 3/2006 |

OTHER PUBLICATIONS

JPOA—Office Action of Japanese Patent Application No. 2010-069910 dated Feb. 18, 2014 with partial English translation.
Gary Scott Tyson, "The Effects of Predicated Execution on Branch Prediction", MICRO 27 Proceedings of the 27th annual international symposium on Micro-architecture, United States, ACM, pp. 196-206, 1994.
JPOA—Office Action of Japanese Patent Application No. 2010-069910 dated May 27, 2014 with partial English translation.

\* cited by examiner

*Primary Examiner* — Robert Fennema
*Assistant Examiner* — Yuqing Xiao
(74) *Attorney, Agent, or Firm* — Fujitsu Patent Center (57) ABSTRACT

A branch prediction circuit includes: a memory for storing information representing a branch instruction and a branch prediction; a control circuit for controlling rewriting information in the memory in accordance with a result of determining whether or not a predicted branch has been taken, and determining an attribute of the predicted branch from a branch condition set by the branch instruction and the predicted branch that has been taken, if the predicted branch has been taken; and a rewriting circuit rewriting the information in the memory under the control of the control circuit.

5 Claims, 6 Drawing Sheets

FIG. 2

```
Loop:
    10 ld    @(r8,r0),r1    // do {
    20 ld    @(r9,r0),r2    //   j = a[i];
    30 cmp   r1,r2          //   k = b[i];
    40 blt   _label1        //   if ( j>k )
    50 sub   r1,r2,r3       //     x = j – k;
    60 bra   _label2        //   else
_label1:
    70 sub   r2,r1,r3       //     x = k – j;
_label2:
    80 st    r3,@(r10,r0)   //   c[i] = x;
    90 add   r0,#1,r0       //   i++
   100 cmp   r0,#100        // }
   110 blt   _loop          // while ( i < 100 )
```

FIG. 3A
result : if

```
cmp  r1,r2            IF ID RR EX MA WB
blt  _label1             IF ID RR EX MA WB
sub  r1,r2,r3                  IF ID RR EX MA WB
bra  _label2                      IF ID RR EX MA WB
sub  r2,r1,r3                           IF ID RR  X
st   r3,@(r9,r0)                           IF ID RR EX MA WB
``` execution time
: 3cycle

FIG. 3B
result : else

```
cmp  r1,r2            IF ID RR EX MA WB
blt  _label1             IF ID RR EX MA WB
sub  r1,r2,r3                  IF ID RR EX MA WB
bra  _label2                      IF ID RR  X
sub  r2,r1,r3                           IF ID RR EX MA WB
st   r3,@(r9,r0)                           IF ID RR EX MA WB
``` execution time
: 3cycle

FIG. 5

BRANCH PREDICTION METHOD AND BRANCH PREDICTION CIRCUIT PERFORMING THE METHOD

CROSS-REFERENCE TO RELATED APPLICATION

This application is based upon and claims the benefit of priority from the prior Japanese Patent Application NO. 2010-069910 filed on Mar. 25, 2010, the entire contents of which are incorporated herein by reference.

FIELD

The embodiments discussed herein are related to a branch prediction method in a central processing unit that executes pipelined instructions and a branch prediction circuit performing the branch prediction method.

BACKGROUND

A pipelined processor that executes pipelined instruction codes fetches instruction codes one after another to cause the stages of the pipeline to constantly operate in order to prevent decrease in the efficiency of the processing of the instruction codes.

In the pipelined processor, the behavior of branch instructions is predicted and instruction codes are speculatively fetched to maintain constant pipeline operation in order to prevent decrease in the efficiency of execution of instruction codes.

In order to maintain constant pipeline operation, a branch prediction scheme with high prediction accuracy needs to be used.

A branch prediction scheme is used that predicts a prediction target and direction for a branch instruction code on the basis of a history recording the targets and directions of past branches, with the aim of improving the accuracy of branch prediction.

The history that records branch targets and directions that are effective for branch prediction depends on parameters such as the number of branch instructions contained in an application program, branch direction bias of each individual branch instruction, and the locations of branch instructions on a memory.

This means that given that the amount of history that may be stored is unchangeable, the accuracy of branch prediction may not be improved unless history entries that are effective for branch prediction are preferentially stored. In other words, the nature of application programs described above needs to be taken into consideration to select history entries of the past that are effective for branch prediction in order to increase the accuracy of branch prediction.

If history of every past branch were recorded, the history entries would occupy a larger memory space. Therefore many approaches to improving predication accuracy with a limited amount of history of the past branches have been proposed (See for example Japanese Laid-Open Patent Publication No. 11-96005).

However, there are many branch instructions that do not have branch direction bias and some regularity beside branch instructions that have branch direction bias and some regularity. It is therefore not easy to select history entries of branch instructions that are worth storing.

SUMMARY

According to one aspect of the embodiments, there is provided a branch prediction circuit including: a memory storing information representing a branch instruction and a branch prediction; a control circuit which determines whether or not a predicted branch has been taken and if taken, determines an attribute of the branch taken, from a branch condition set by the branch instruction and the branch taken, and controls rewriting of information in the memory depending on the determinations; and a rewriting circuit rewriting information in the memory under the control of the control circuit.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

DESCRIPTION OF EMBODIMENTS

The present invention encompasses, in addition to the exemplary embodiments described herein, design modifications to the exemplary embodiments and combinations of any components that appear in the exemplary embodiments which may occur to those skilled in the art. The present invention also encompasses implementations in which a component is replaced with another component that has the same effects and is not limited to the exemplary embodiments described herein.

Figure 1:
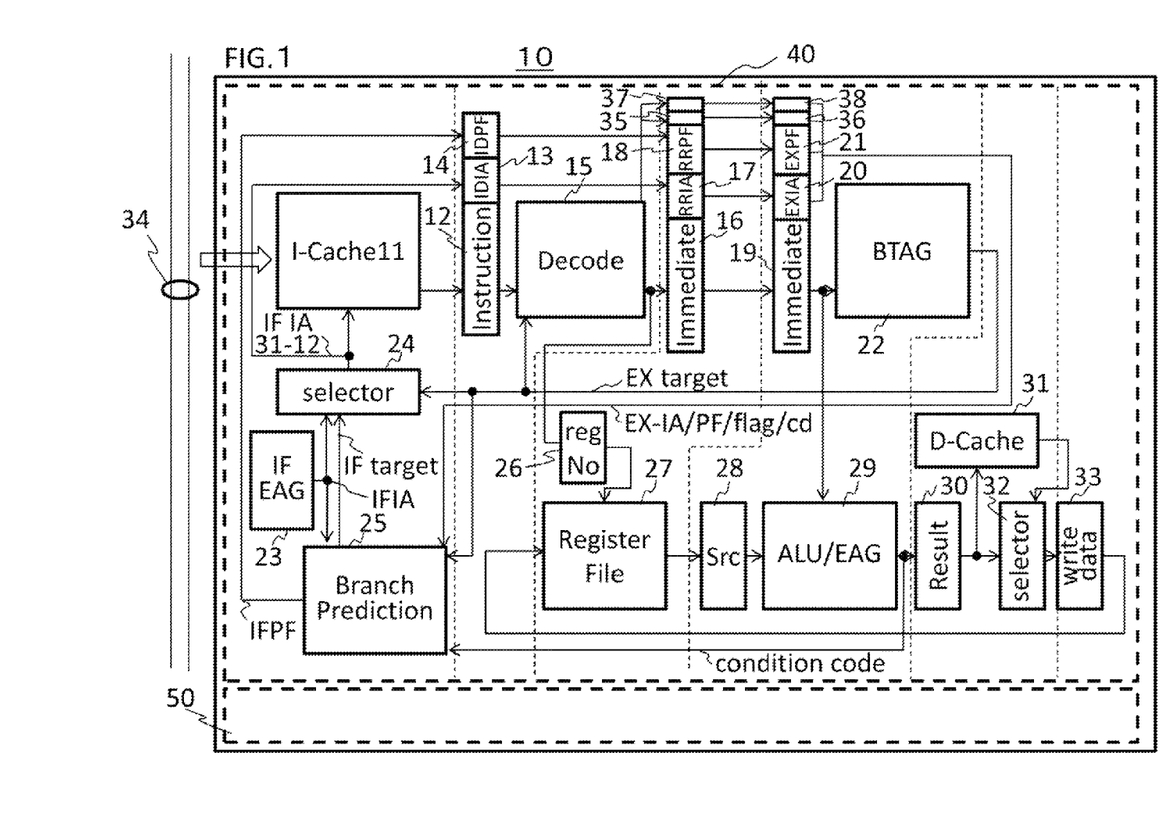
FIG. 1 is a diagram illustrating a computer 10 relating to an exemplary embodiment.

FIG. 1 illustrates a computer 10 relating to an exemplary embodiment. The computer 10 includes pipelines 40 and 50 each including an instruction cache (I-cache) 11, registers 12, 13, and 14, a decoder 15, registers 16, 17, 18, 19, 20, and 21, a branch target address generator (BTAG) 22, an instruction fetch effective address generator (IFEAG) 23, a selector 24, a branch prediction circuit 25, a reg No register 26, a register file circuit 27, a source (Src) register 28, an arithmetic logic/effective address generator (ALU/EAG) 29, a result register 30, a data cache (D-cache) 31, a selector 32, a write data register 33, short-forward-branch flag registers 35 and 36, an register read branch condition code (RRBCD) register 37, and an execute branch condition code (EXBCD) register 38. As will be described later, each of the pipelines 40 and 50 includes instruction prefetch (IF), instruction decode (ID), register read (RR), instruction execution (EX), memory access (MA), and write back (WB) stages. The dotted lines in FIG. 1 represent boundaries between circuits that belong to each of the stages of the pipeline.

In the instruction prefetch stage, the IFEAG 23 computes an instruction fetch instruction address (IFIA), which is the address specifying a memory location in which the next instruction to be fetched is stored. The IFEAG 23 then outputs the IFIA to the selector 24 and the branch prediction circuit 25.

The I-cache 11 is an instruction cache that stores instructions provided from an external source of the computer 10 through an external bus 34 as indicated by an arrow in FIG. 1. In the instruction prefetch (IF) stage of the pipeline, the I-cache 11 receives an IFIA from the selector 24, fetches an instruction corresponding to the IFIA from a memory location of the I-cache 11, and outputs the instruction to the register 12.

In the instruction prefetch stage, the branch prediction circuit 25 is a circuit that receives an IFIA from the IFEAG 23 and predicts a branch direction and a branch target address for the branch instruction and includes a branch prediction mechanism. After branch prediction, the branch prediction circuit 25 outputs an IF target indicating a branch target based on the branch prediction to the selector 24 and also outputs an Instruction Fetch Profile (IFPF) to the register 14 as an instruction decode profile (IDPF).

An IFPF is a digital counter value consisting of two bits. The counter value indicates the provability of branch indicated by the IF target associated with a branch instruction. For example, the counter value "11" represents "strongly taken" (the probability that the branch will be taken is high), "10" represents "weakly taken" (the probability that the branch will be taken is low), the counter value "01" represents "weakly not taken" (the probability that the branch will not be taken is low), "00" represents "strongly not taken (the probability that the branch will not be taken is high). The counter value is history information that is updated according to whether or not a branch is evaluated as taken or not taken for each branch instruction. For example, when a branch of a branch instruction is evaluated as not taken, the counter value associated with the branch instruction is decremented toward "weakly not taken" (high probability of not taken)".

In the instruction prefetch stage, when a branch instruction is fetched, the selector 24 selects a combination of an IF target provided from the branch prediction circuit 25 and an IFIA and outputs the combination to the I-cache 11. However, when a branch target different from the branch target indicated by an IF target is specified in an EX target (branch target) output from the BTAG 22, the selector 24 outputs the EX target to the I-cache 11 again. When a fetched instruction is not a branch instruction, the selector 24 outputs only an IFIA provided from the IFEAG 23 to the I-cache 11.

The selector 24 also outputs the 12th to 31st bits of the IFIA, which includes the 0th to 31st bits, to the register 13 as an instruction decode instruction address (IDIA). The IDIA is used as an address of a memory location of the branch prediction mechanism in the branch prediction circuit 25.

In the instruction decode (ID) stage in pipeline, the register 12 is an instruction storage register storing an instruction output from the I-cache 11.

The register 13 in the instruction decode stage is an address register storing an IDIA output from the selector 24.

The register 14 in the instruction decode stage is a profile buffer storing an IFPF output from the branch prediction circuit 25 as an IDPF.

The decoder 15 in the instruction decode stage decodes an immediate from an instruction, computes the logical value of a register read flag (RRFLAG) associated with a branch target corresponding to the branch instruction, and computes a register read branch condition code (RRBCD).

Here, the RRBCD is a code indicating which branch condition among multiple branch conditions is met. The conditions include a not-taken branch condition.

The RRFLAG is set to "1" when the product of the address difference between a branch target address relating to a branch instruction and the address of the branch instruction and the length of the pipeline from the instruction decode stage to the instruction execution stage is less than or equal to 4 and the branch is a forward branch; the RRFLAG is set to "0" when the product is greater than 4 or the branch is a backward branch. That is, the RRFLAG "1" indicates that the branch is a short, forward branch. While the threshold value, address difference×pipeline length, is equal to 4 in the foregoing, the threshold value may be set to a value other than 4. The pipeline length also depends on the number of pipelines of the computer 10. That is, the pipeline length is a value that is dependent on the pipeline structure.

The register 16 in the register read (RR) stage of the pipeline is a register that stores an immediate (a value identifying data to be processed) provided from the decoder 15. The Reg No register 26 is a register that stores an immediate provided from the decoder 15.

The register file circuit 27 in the register read stage is a memory circuit that stores an immediate received from the Reg No register 26.

The register 17 in the register read stage is an address register that stores a register read instruction address (RRIA) relating to an immediate output from the decoder 15. An IDIA stored in the register 13 is stored in the register 17 as a register read instruction address (RRIA).

The register 18 in the register read stage is a profile register that stores an IDPF output from the register 14 as a register read profile (RRPF).

The short-forward-branch flag register 35 in the register read stage is a register that stores an RRFLAG relating to a branch state output from the decoder 15.

The branch condition register 37 in the register read stage is a register that stores an RRBCD output from the decoder 15.

The register 19 in the instruction execution (EX) stage of the pipeline receives an immediate stored in the register 16 and stores the immediate.

The register 20 in the instruction execution (EX) stage of the pipeline is an address register that receives an RRIA stored in the register 17 and stores the RRIA as an execute instruction address (EXIA).

The register 21 in the instruction execution (EX) stage of the pipeline is a profile buffer that receives an RRPF stored in the register 18 and stores the RRPF as an execute profile (EXPF).

The short-forward-branch flag register 36 in the instruction execution (EX) stage of the pipeline receives an RRFLAG provided from the short-forward-branch flag register 35 and stores the RRFLAG as an execute flag (EXFLAG).

The register 38 in the instruction execution (EX) stage of the pipeline of the pipeline receives an RRBCD stored in the register 37 and stores the RRBCD as an execute branch condition code (EXBCD).

The BTAG 22 in the instruction execution (EX) stage of the pipeline is a circuit that computes a branch target address and provides the branch target address (EX target) to the selector 24 and to the branch prediction circuit 25 when a predicted branch has not been taken, namely a branch misprediction has occurred, or when a branch has not been predicted.

The Src register 28 in the instruction execution (EX) stage of the pipeline is a register that stores an immediate (a value identifying data to be processed) read from the register file circuit 27.

The ALU/EAG 29 in the instruction execution (EX) stage of the pipeline performs computation specified in an instruction and computes an address for data access. The computation here is operations such as comparison between the magnitudes of values, subtraction and addition. The ALU/EAG 29 also outputs a condition code (a branch condition) relating to a branch instruction to the branch prediction circuit 25.

The result register 30 in the memory access (MA) stage is a register that stores the result of computation performed in the ALU/EAG 29 and an address calculated for data access.

The D-cache 31 in the memory access (MA) stage is a cache that temporarily stores the result of computation and a calculated address for data access provided from the result register 30 and then outputs the result and the address to the selector 32.

The selector 32 in the memory access (MA) stage is a circuit that selects the result of computation and the computed address for data access from the result register 30 or the result of computation and the calculated address for data access stored in the D-cache 31 and outputs the selected result and address to the write data register 33.

The write data register 33 in the write back (WB) stage is a register that stores data to be stored in the register file circuit 27.

Figure 2:
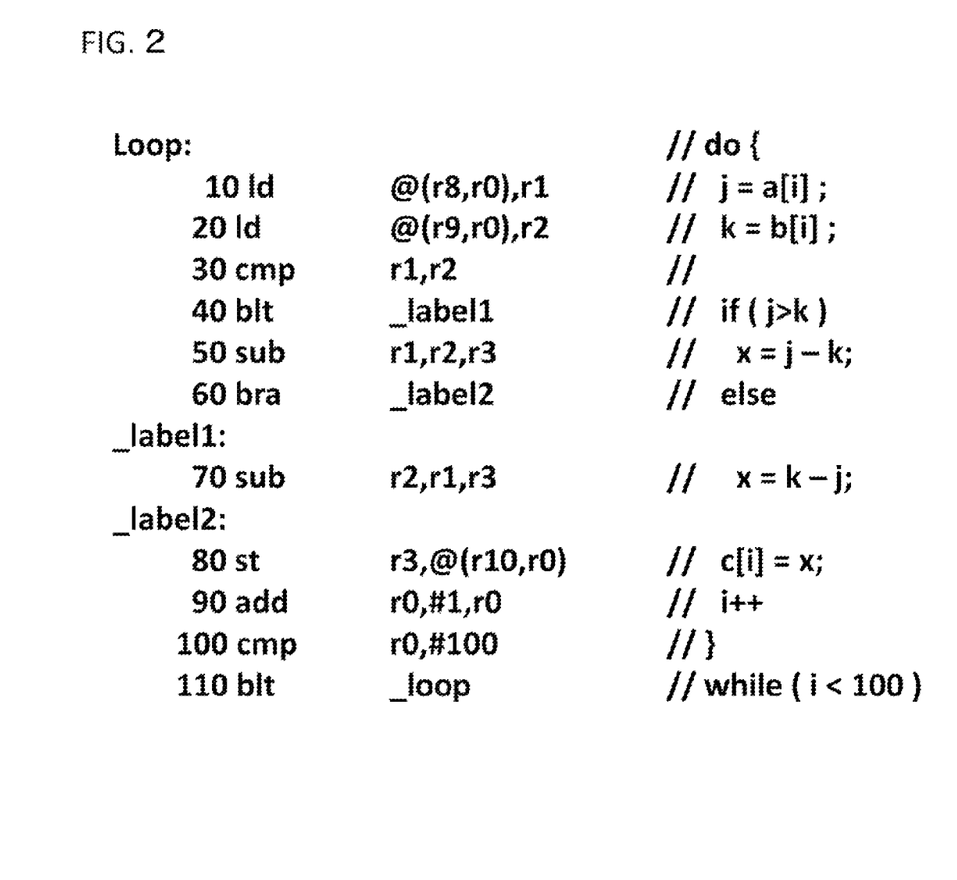
FIG. 2 is a diagram illustrating forward and backward branches of instructions input in the computer 10 in FIG. 1.

FIG. 2 illustrates forward and backward branches of instructions input in the computer 10 illustrated in FIG. 1.

The program from line 10 to line 110 following the label, Loop, constitutes what is called a do loop. The instruction, "@(r8,r0),r1", on line 10 is an instruction to store r1 in the register specified by values r0 and r8. The instruction, "@(r9, r0),r2", on line 20 is an instruction to place r2 in the register specified by r0 and r9. The instruction, "cmp r1,r2", on line 30 is an instruction to compare values r1 with r2. The instruction, "blt Label1", on line 40 is an instruction to branch to the line with Label 1 if r1 is less than r2. The instruction, "sub r1,r2, r3", on line 50 instructs to compute r3=r1−r2. The instruction, "bra_Label2", on line 60 is an instruction to branch to the line with Label2. The instruction, "sub r2,r1,r3", on line 70 instructs to compute r3=r2−r1. The instruction, "st r3,@(r10, r0)", on line 80 instructs to place r3 in the register specified by r10 and r0. The instruction, "add r0,#1,r0", on line 90 instructs to add 1 to r0 to output as r0. The instruction, "r0, #100", on line 100 instructs to compare r0 with 100. The instruction, "blt_loop", on line 110 instructs to repeat the loop if r0 is less than 100, otherwise, to exit the loop.

The direction of the branch for the instruction on line 40, "blt_Label1", in the sequence of the instructions given above changes depending on data. Therefore it is difficult to predict the branch direction for the instruction on line 40. On the other hand, the branch for the instruction on line 60, "bra_Label2", always goes to a line with a greater line number (forward). Since the branch direction for the instruction on line 60 is fixed, branch prediction for the instruction on line 60 will be always successful. The branch for the instruction on line 110, "blt_loop", is likely to be taken and, if taken, to a line with a smaller line number (backward).

In this way, branch direction and branch distance of a branch instruction may be determined from its instruction code. In the instruction decode stage, the decoder 15 identifies from an instruction the branch direction and branch distance. If the "address difference between the branch target address and the current address" multiplied by the "pipeline length from the instruction decode stage to the instruction execution stage" is less than or equal to 4 and the branch is taken forward, the decoder 15 sets the logical value of the short-forward-branch flag to "1"; if the product is greater than 4 or the branch is backward branch, the decoder 15 sets the logical value of the short-forward-branch flag to "0". It may be seen from the foregoing that the short-forward-branch flag is a flag that indicates attributes of the branch of the instruction.

Figure 3A:
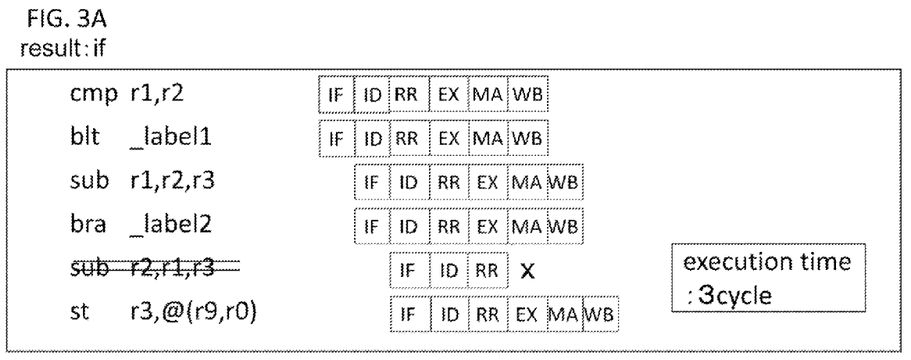
FIGS. 3A and 3B are diagrams illustrating pipeline operations when instructions are input in the computer 10 in FIG. 1.

FIG. 3A illustrates a pipeline operation performed when the "if" condition on line 40 holds. An example will be described in which a predicted branch is taken when instructions "cmp r1,r2", blt_label1", "sub r1,r2,r3", (bra_label2), (sub r1,r2,r3), and "st r3,@(r9,r0)" in FIG. 3A are executed. What the instructions do is as follows: First, value r1 is compared with value r2. If r1 is greater, r3=r1−r2 is computed; if r2 is greater, r3=r2−r1 is computed. Then, the result r3 is stored in the register specified by values r9 and r0.

In the computer 10 illustrated in FIG. 1, the instructions are executed, two at a time concurrently in the pipelines 40 and 50. First, instructions "cmp r1,r2" and "blt_label1" are set in the instruction fetch stage. Then, instructions "sub r1,r2,r3" and "st r3,@(r9,r0)" are set in the instruction fetch stage according to output from a branch address from the branch prediction circuit 25 including the branch prediction mechanism in the pipeline 40. Here, when the instructions "cmp r1,r2" and "blt_label1" first set in the instruction fetch stage reach the instruction execution stage and the branch outcome is definitely shown to be successful, execution of the next instructions "sub r2,r1,r3" and "st r3,@(r9,r0)" set in the instruction fetch stage proceed to execution. As a result, the branch prediction circuit 25 in the pipelines 40 and 50 updates the profiles (history information) of the branch addresses with the successful branch prediction. Instruction "sub r2,r1,r3" that is not to be executed when the branch direction is determined is cancelled.

Figure 3B:
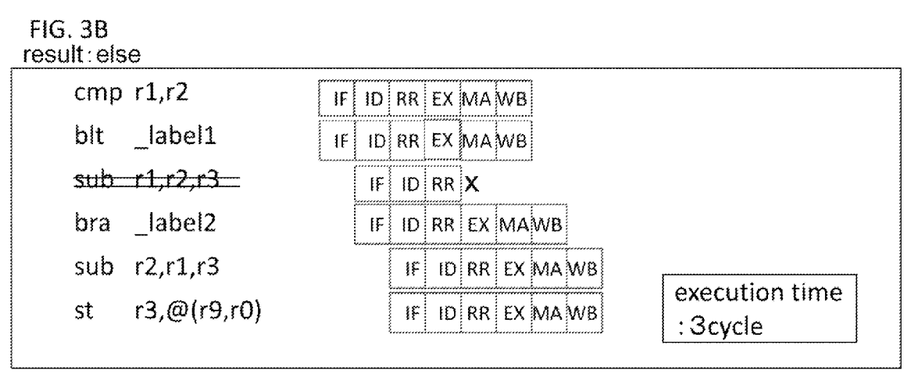

FIG. 3B illustrates a pipeline operation performed when "else" blanch on line 60 is taken. Illustrated in FIG. 3B is an example in which when instructions "cmp r1,r2", "blt_label1", "sub r1,r2,r3", "bra_label2", "sub r1,r2,r3", "st r3,@ (r9,r0)" are executed, the predicted branch is taken in the pipeline. What the instructions do is as follows. First, value r1 is compared with value r2. If value r1 is greater, r3=r1−r2 is computed; if r2 is greater, r3=r2−r1 is computed. Then the result r3 is stored in the register specified by values r9 and r0.

In the computer 10 illustrated in FIG. 1, instructions "cmp r1,r2" and "blt_label1" are set in the instruction fetch stage of the pipelines 40 and 50 first.

Then instructions "sub r1,r2,r3" and "st r3,@(r9,r0) are set in the instruction fetch stage according to output of a branch address from the branch prediction circuit 25 including the branch prediction mechanism in the pipelines 40 and 50. If the instructions "cmp r1,r2,r3" and "blt_label1" set in the instruction execution stage result in a branch not taken, the pipeline operation for the instructions "sub r1,r2,r3" and "st r3,@(r9,r0)" is aborted. Then, the instructions "bra_label1" and "sub r2,r1,r3", which are correct branch targets, are executed. When the pipeline operation for the instructions "sub r1,r2,r3" and "st r3,@(r9,r0)" is aborted, the result of the computation is sent from the ALU/EAG 29 of the pipeline 50 to the branch prediction circuit 25 of the pipelines 40 and 50. As a result, in the branch prediction circuit 25, the profile (history information) of the branch address is updated with the branch misprediction.

Figure 4:
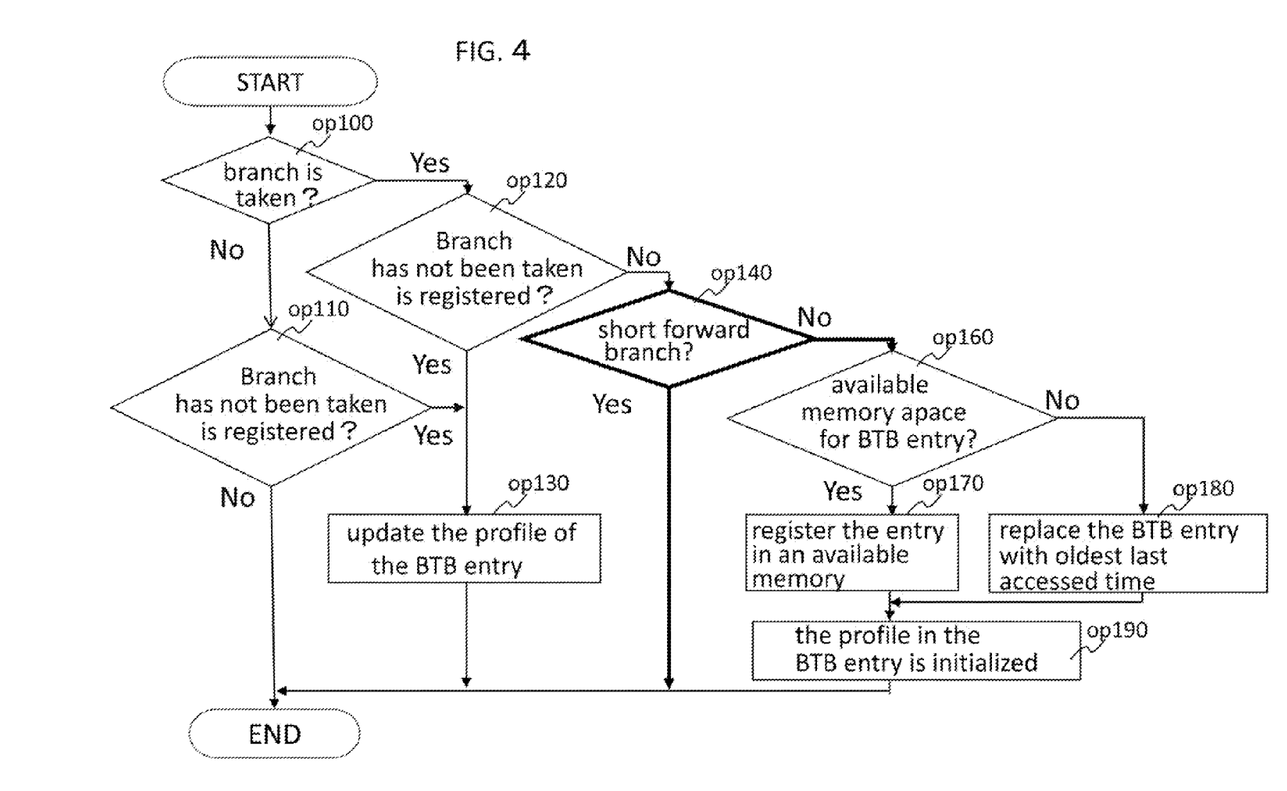
FIG. 4 is a flowchart of a process for registering a Branch Target Buffer (BTB) entry including new history information or a new BTB entry in a BTB entry management circuit 200 storing BTB entries.

FIG. 4 is a flowchart of a process for registering a branch target buffer (BTB) entry including new history information or a new BTB entry in the BTB history management circuit 200 that stores BTB entries. The BTB entry management circuit 200 storing BTB entries is provided in the branch prediction circuit 25 including the branch prediction mechanism. Each BTB entry includes an address at which a branch instruction is stored, an address indicating a branch target, a profile (PF, history information) indicating the probability of the branch being taken, and a valid flag (VFLAG) indicating that the BTB entry is established.

In the computer 10, when an EX target indicating an actual branch condition is provided from the BTAG 22 to the branch prediction circuit 25, determination is made in operation op100 in the flowchart of FIG. 4.

At operation op100, the branch prediction circuit 25 determines whether or not a branch based on a prediction has been taken, that is, whether or not the branch corresponding to the BTB entry on which a prediction is based has been taken. If the branch has been taken, the branch prediction circuit 25 proceeds to operation op120. On the other hand, if the branch has not been taken, the branch prediction circuit 25 proceeds to operation op110.

At operation op110, the branch prediction circuit 25 determines whether or not a BTB entry containing a branch address to which the branch has not been taken is registered in the BTB entry management circuit 200. If the BTB entry is not registered in the BTB entry management circuit 200, the branch prediction circuit 25 exits the process without altering any of the BTB entries stored in the BTB entry management circuit 200.

At operation op120, the branch prediction circuit 25 determines whether or not a BTB entry containing the branch address to which the branch has been taken is registered in the BTB entry management circuit 200. If the entry is registered, the process proceeds to operation op130. If the entry is not registered, the branch prediction circuit 25 proceeds to operation op140.

At operation op130, the branch prediction circuit 25 updates the profile (history information) of the BTB entry containing the branch address to which the branch has been taken.

At operation op140, if the RRFLAG or EXFLAG (the flag indicating that the branch is a short forward branch) associated with the BTB entry containing the branch address to which the branch has been taken is a logical 1, that is, if the branch relating to the BTB entry is a short forward branch, the process will end without updating the profile (history information) of any of the BTB entries in the BTB management circuit 200 nor replacing any of the BTB entries. On the other hand, if the RRFLAG or EXFLAG is a logical 0, the process proceeds to operation op160.

Here, if a branch caused by a branch instruction is a short forward branch, an instruction not to be executed is cancelled early as illustrated in FIG. 3. Accordingly, there is relatively little wasted operation in the pipeline. Branch prediction for an instruction that places little load on the pipeline is minimally effective. Furthermore, if a BTB entry relating to such a branch instruction is registered in the BTB entry management circuit 200 in order to make a branch prediction for the branch instruction, it may preclude registration of a BTB entry of an instruction for which branch prediction is effective in the BTB entry management circuit 200, because the BTB entry management circuit 200 has a limited memory space (BTBs 240 and 250) for storing BTB entries.

Therefore, when the RRFLAG or EXFLAG associated with a BTB entry is a logical 1, neither update of the history information nor replacement of the BTB entry is performed, thereby avoiding registration of the BTB entry for the instruction for which branch prediction is ineffective in memory (BTBs 240 and 250). Thus the branch prediction circuit 25 determines whether or not a BTB entry is to be registered on the basis of the short-forward-branch flag, that is, branch information.

At operation op160, the branch prediction circuit 25 determines whether or not there is an available BTB memory space for storing the BTB entry containing the branch address to which branch has been taken. If there is an available BTB memory space, the branch prediction circuit 25 proceeds to operation op170; otherwise the branch prediction circuit 25 proceeds to operation op180.

At operation op170, the branch prediction circuit 25 registers the entry in an available memory space and then proceeds to operation op190.

At operation op180, the branch prediction circuit 25 causes a least-recently-used (LRU) management circuit to find a BTB entry with the oldest last accessed time among the registered BTB entries. The branch prediction circuit 25 replaces the detected BTB entry with the new BTB entry to be registered. The branch prediction circuit 25 then proceeds to operation op190. While whether a BTB entry is old or new is determined based on the last accessed time in the example, whether a BTB entry is old or new may be detected based on order information that is set based on accessed times.

If there is more than one BTB entry with the oldest last accessed time, one of the oldest BTB entries may be selected in order or randomly based on the addresses of the BTB entries in the BTBs 240 and 250 and replaced.

At operation op190, the profile (history information) in the BTB entry containing the branch address is initialized. The initialization means that the counter value for the profile is set to a predetermined value. For example, the counter value may be set to 11 (strongly taken (the probability that branch will be taken is high)).

Figure 5:
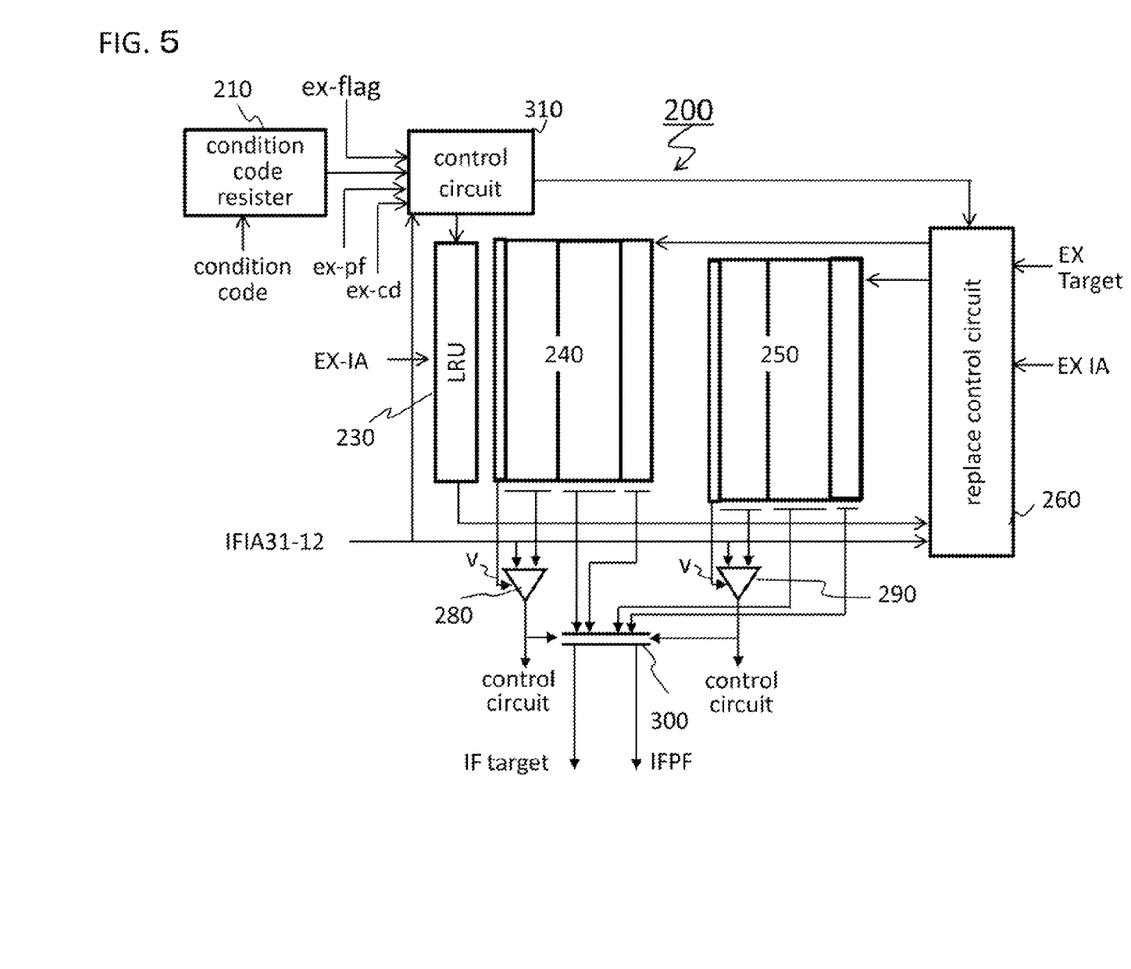
FIG. 5 is a circuit block diagram of a BTB entry management circuit 200 included in a branch prediction circuit 25.

FIG. 5 is a circuit block diagram of the BTB entry management circuit 200 included in the branch prediction circuit 25.

The BTB entry management circuit 200 includes a condition code register 210, a least-recently-used (LRU) management circuit 230, BTBs 240 and 250, a replacement control circuit 260, matching detection circuits 280 and 290, a multiplexer 300, and a control circuit 310.

In the instruction prefetch stage, the BTB entry management circuit 200 predicts a branch target address for a fetched instruction indicating a branch condition. The prediction will be described later in detail with reference to FIG. 6.

In the instruction execution (EX) stage of the pipeline, the BTB entry management circuit 200 determines based on the result of branch prediction whether or not the profile of a BTB entry is to be updated or a BTB entry is to be replaced, and determines which of the update of the profile of the BTB entry and replacement of the BTB entry is to be performed.

The condition code register 210 is a register storing a branch condition for a branch instruction. The condition code register 210 provides a branch condition to the control circuit 310.

When a branch instruction is executed, the control circuit 310 makes determination described with reference to FIG. 4. The control circuit 310 provides an activation signal to the replace control circuit 260 and the LRU management circuit 230 in order to determine whether a BTB entry is to be registered in the BTB 240, 250, or a registered BTB entry needs to be replaced with a BTB entry relating to the current branch instruction being executed, or the profile (history information) of a registered BTB entry needs to be updated.

First, the control circuit 310 receives a branch condition from the condition code register 210 and determines, on the basis of the branch condition and an EXBCD received from the BTAG 22, whether or not the branch has been taken. The control circuit 310 uses a matching signal from the matching detection circuit 280 to determine whether or not a BTB entry relating to a combination of a branch instruction that has resulted in a branch not taken and the branch prediction is registered in the BTB 240 or 250 and also determines whether or not a BTB entry relating to a combination of a branch instruction that resulted in a branch taken and the branch prediction is registered in the BTB 240 or 250.

If the branch has not been taken and a BTB entry relating to the combination of the branch instruction and the branch prediction is registered in the BTB 240 or 250, the control circuit 310 sends an activation signal to the replacement control circuit 260 to access the BTB 240 or 250 by using EXIA (execution instruction address) and alter the profile (PF, history information) of the BTB entry registered in the memory location specified by the address so as to decrement the counter value of the history information.

On the other hand, if the branch has been taken and a BTB entry relating to the combination of the branch instruction and the branch prediction is registered in the BTB 240 or 250, the control circuit 310 sends an activation signal to the replacement control circuit 260 to update the profile (PF, history information) of the BTB entry registered in the BTB 240 or 250 so as to increment the counter value of the history information. That is, the control circuit 310 increments the counter value of the execute profile (EXPF) by 1, then sends the EXPF to the replacement control circuit 260, which then replaces the PF of the BTB entry with the EXPF.

If the branch has been taken and the control circuit 310 determines from the matching signal from the matching detection circuit 280 that a BTB entry relating to the combination of the branch instruction and the branch prediction is not registered in the BTB 240 or 250, the control circuit 310 determines from the EXFLAG whether or not the branch has been a short, forward branch. If the branch has been a short, forward branch, the control circuit 310 does not activate the replace control circuit 260.

On the other hand, if the branch is not a short, forward branch, the control circuit 310 activates the replace control circuit 260 and uses the EXIA to access the BTB 240 or 250 to determine whether or not there is an available space in the BTB 240 or 250.

If there is an available space in the BTB 240 or 250, the control circuit 310 controls the replacement control circuit 260 so as to register a BTB entry relating to the combination of the branch instruction and the branch prediction that resulted in the branch taken in the available space by using the EXIA.

If there is no available space in the BTB 240 or 250, the control circuit 310 outputs a signal that activates the LRU management circuit 230. The LRU management circuit 230 sends registration time of the BTB entry registered in the location in the BTB 240 specified by the EXIA and the registration time of the BTB entry registered in the location in the BTB 250 specified by the EXIA to the replacement control circuit 260. Based on the registration times of the BTB entries, the replacement control circuit 260 identifies one of the two BTB entries that has the older registration time. The replacement control circuit 260 replaces one of the two BTB entries that has the older registration time with the BTB entry relating to the combination of the branch instruction that resulted in the branch taken and the branch prediction.

While the LRU management circuit 230 manages registration times in the example described above, the LRU management circuit 230 may manage order information based on registration times. In that case, the replacement control circuit 260 receives order information from the LRU management circuit 230 and determines whether a BTB entry is old or new on the basis of the order information.

While the BTB entry to be replaced is selected based on which of the registration times in the LRU management circuit 230 is older or on order information in the example described above, a round robin algorithm that alternately selects between a BTB entry stored in the BTB 240 and a BTB entry stored in the BTB 250 may be used to select the BTB entry to replace. Alternatively, a random algorithm may be used to select a BTB entry stored in the BTB 240 or a BTB entry stored in the BTB 250 to replace.

When the BTB entry relating to the combination of the branch instruction that resulted in a branch taken and the branch prediction is registered in the BTB 240 or 250 and when the BTB having an older registration time is replaced, the replacement control circuit 260 resets the PF (history information) of the new RTB entry to the initial value. The initial value may be the counter value "11" corresponding to strongly taken (highly probable), for example.

When replacement with the new BTB entry is made in the BTB 240 or 250, the LRU management circuit 230 registers the registration time of the new BTB entry. The information registered here by the LRU management circuit 230 is not limited to registration time; Registration order information based on the registration time may be registered.

Figure 6:
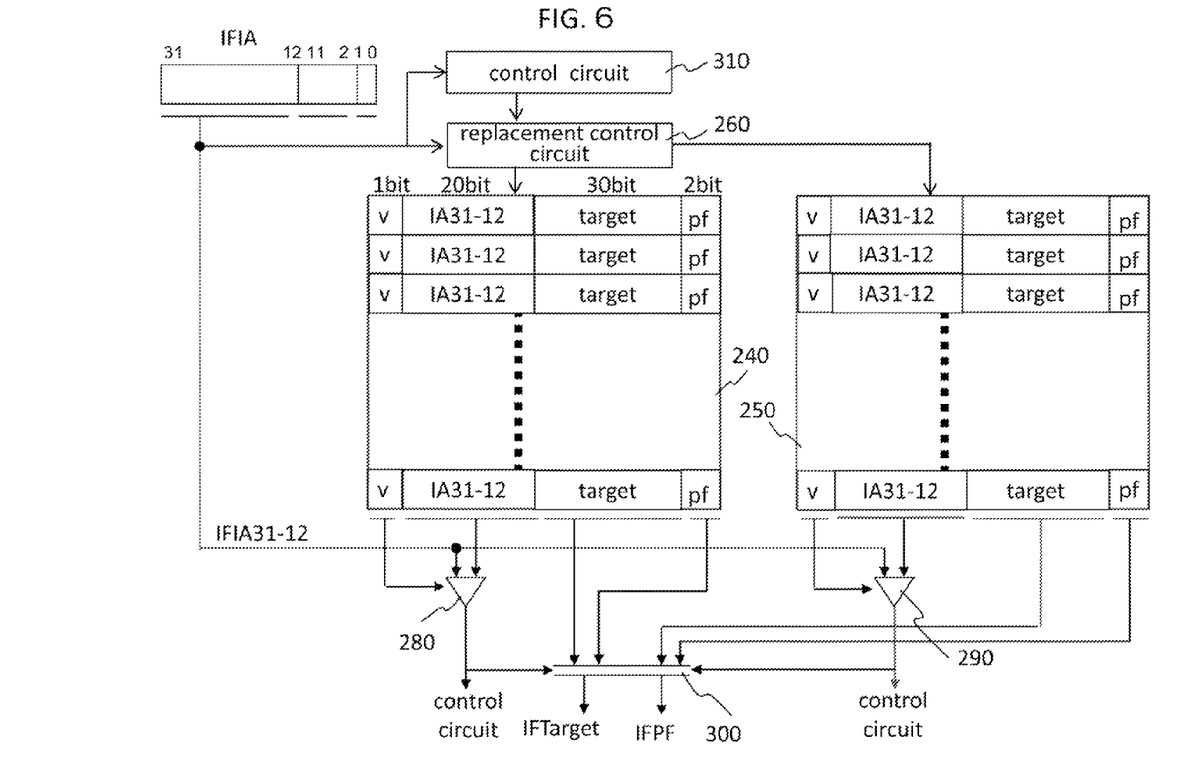
FIG. 6 is a diagram detailing a prediction operation of the BTB entry management circuit 200.

A prediction operation of the BTB entry management circuit 200 will be described in detail with reference to FIG. 6. FIG. 6 is a circuit block diagram of a circuit block that performs the prediction operation, extracted from the circuit block diagram of FIG. 5.

In the instruction prefetch stage, the BTB entry management circuit 200 predicts a branch target address for a fetched instruction indicating a branch condition.

The BTB 240 and 250 are circuits that store BTB entries and read a BTB entry based on an address provided from the replacement control circuit 260.

When the control circuit 310 receives an IFIA, the control circuit 310 sends an activation signal to the replacement control circuit 260. The replacement control circuit 260 uses the 12th to the 31st bits of the IFIA as an address and reads a BTB entry from the location in the BTB 240 and the BTB 250 specified by the address. The BTB entry consists of 53 bits, of which 2 bits are assigned to the IFPF, 30 bits to the IF target, 20 bits to the IFIA, which is the 12th to 31st bits of the BTB entry, and 1 bit is assigned to the VFLAG. If the number of BTB entries is increased in order to increase the accuracy of branch prediction, the areas occupied by the BTBs 240 and 250 increases.

The matching detection circuits 280 and 290 compare IA bits 31-12 output from the BTBs 240 and 250, respectively, with the 12th to 31st bits of an input IFIA and output a matching signal to the multiplexer 300 and the control circuit 310. The matching detection circuits 280 and 290 output the matching signal only if the logical value of the VFLAG of the BTB entry is "1".

The multiplexer 300 receives matching signals, IF targets and IFPFs from the BTBs 240 and 250 and outputs the IF target corresponding to one of the IFPFs that has a higher counter value, together with that IFPF. The IF target is output to the selector 24 and the IFPF is output to the register 14.

In summary, a branch prediction circuit (the BTB entry management circuit 200) includes:

a memory (the BTBs 240 and 250) storing information (a BTB entry) representing a branch instruction and a branch prediction;

a control circuit (the control circuit 310) which determines whether or not the predicted branch has been taken and if taken, determines an attribute of the branch taken, from a branch condition set by the branch instruction (a condition code stored in the condition code register 210) and the branch taken (EXBCD), and controls rewriting of the information in the memory on the basis of the determinations; and a rewriting circuit rewriting the information in the memory under the control of the control circuit (the control circuit 310).

The control circuit in the branch prediction circuit (the BTB entry management circuit 200) determines the attribute of the branch taken on the basis of the "address difference between the branch target address and the address of the branch instruction" multiplied by the "length of the pipeline from an instruction decode stage to an instruction execution stage".

A branch prediction method in a branch prediction circuit which includes a first memory (the BTB 240) storing a branch instruction and information representing a branch prediction (a BTB entry) and contained in a processing device (the computer 10) which executes a branch instruction, the method including the steps of:

storing the information in a memory;

determining whether or not the branch predicted has been taken and if taken, determining an attribute of the branch taken, from a branch condition set by the branch instruction (a condition code stored in the condition code register 210) and the branch taken (EXBCD);

rewriting the information in the memory on the basis of the determinations; and predicting a branch on the basis of the information when the branch instruction is executed on the processing device.

In the branch prediction method, the determination of the attribute of the branch taken is made on the basis of the "address difference between the branch target address and the address of the branch instruction" multiplied by the "length of the pipeline from an instruction decode stage to an instruction execution stage".

In the branch prediction method, the branch prediction circuit includes a second memory (the BTB 250) storing information representing a branch instruction and a branch prediction (a BTB entry) in addition to the first memory (the BTB 240), and the step of storing the information includes the steps of storing the information in the second memory and, when storing the information, recording store order information (registration order information) that is based on the time at which the information is stored; and the step of rewriting the information includes the step of selecting between the information in the first memory and the information in the second memory as the information to be rewritten depending on the memory order information.

In the branch prediction method, the branch prediction circuit includes a second memory (the BTB 250) storing information representing a branch instruction and a branch prediction (a BTB entry) in addition to the first memory (the BTB 240), and the step of rewriting the information includes the step of alternately selecting between the information in the first memory and the information in the second memory as the information to be rewritten.

In the branch prediction method, the branch prediction circuit includes a second memory (the BTB 250) storing information representing a branch instruction and a branch prediction (a BTB entry) in addition to the first memory (the BTB 240), and the step of rewriting the information includes the step of randomly selecting between the information in the first memory and the information in the second memory.

If a branch caused by a branch instruction is a short forward branch, an instruction not to be executed is cancelled early as illustrated in FIG. 3. Accordingly, there is relatively little wasted operation in the pipeline. Branch prediction for an instruction that places little load on the pipeline is minimally effective. Furthermore, if a BTB entry relating to such a branch instruction is registered in the BTBs 240 and 250 in order to make a branch prediction for the branch instruction, it may preclude registration of a BTB entry of an instruction for which branch prediction is effective in the BTBs 240 and 250, because the memory area (BTBs 240 and 250) for storing BTB is limited.

Here, a branch instruction for which branch prediction is effective is an instruction that has a value determined by the distance between the branch instruction and the branch target and the pipeline length is greater than a predetermined value. A branch instruction for which branch prediction is minimally effective is an instruction that has a value determined by the distance between the branch instruction and the branch target and the pipeline length is smaller than the predetermined value.

Accordingly, if the BTB entries of branch instructions for which branch prediction is minimally effective are not stored in the BTBs 240 and 250, the BTB entries of branch instructions for which branch prediction is effective, especially branch instructions whose branch directions and branch targets have some regularity, may be efficiently stored in the BTBs 240 and 250.

Before a new BTB entry is registered, determination is made based on branch information as to whether any of the registered BTB entries is to be replaced with the new BTB entry and if it is determined that any of the registered BTB entries is to be replaced, the BTB entry is replaced with the new one. In this way, the number of BTB entries stored is prevented from increasing, that is, the memory circuit area of the prediction circuit (the BTB entry management circuit 200) is prevented from increasing while the accuracy of prediction of the prediction mechanism is increased.

Preferably, the branch information on which the determination as to whether a load is placed on the pipeline or not is based is information concerning whether or not the "address difference between the branch target address and the address of the branch instruction" multiplied by the "the length of the pipeline from the instruction decode stage to the instruction execution stage" is less than or equal to 4.

The present invention may provide a branch prediction method that effectively obtains history entries that are effective for branch prediction from among entries of the history concerning branch instructions to improve the accuracy of branch prediction, and a branch prediction circuit that performs the branch prediction method.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A branch prediction circuit comprising:
   a memory for storing information representing a branch instruction and a branch prediction;
   a control circuit for controlling rewriting information in the memory in accordance with a result of determining whether or not a predicted branch has been taken, and determining an attribute of the predicted branch from a branch condition set by the branch instruction and the predicted branch that has been taken, if the predicted branch has been taken; and a rewriting circuit rewriting the information in the memory under the control of the control circuit;

wherein the determining an attribute of the predicted branch is performed on the basis of an address difference multiplied by a length of the pipeline from an instruction decode stage to an instruction execution stage, the address difference being between a branch target address and an address of the branch instruction.

2. A branch prediction method performed by a processing device which executes a branch instruction, the processing device having a branch prediction circuit which includes a memory storing a branch instruction and information representing a branch prediction, the method comprising:

storing the information in a memory;

determining whether or not a predicted branch has been taken and determining an attribute of the predicted branch from a branch condition set by the branch instruction and the predicted branch which has been taken;

rewriting the information in the memory in accordance with a result of determining whether or not a predicted branch has been taken, and determining an attribute of the predicted branch from a branch condition set by the branch instruction and the predicted branch that has been taken, if the predicted branch has been taken; and predicting a branch on the basis of the information when the branch instruction is executed on the processing;

wherein the determining an attribute of the predicted branch is performed on the basis of an address difference multiplied by a length of the pipeline from an instruction decode stage to an instruction execution stage, the address difference being between a branch target address and an address of the branch instruction.

3. The branch prediction method according to claim 2, wherein the memory in the branch prediction circuit includes a first memory and a second memory storing the information representing the branch instruction and the branch prediction, wherein the storing the information in the memory includes storing the information in the first memory or the second memory, wherein when storing the information in the first memory or the second memory, recording store order information that is based on the time at which the information is stored in the first memory or the second memory; and the rewriting the information in the memory in accordance with a result of determining whether or not a predicted branch has been taken includes the rewriting the information in the first memory or in the second memory in accordance with a result of determining whether or not a predicted branch has been taken, and wherein the rewriting the information in the first memory or the second memory in accordance with a result of determining whether or not a predicted branch has been taken is performed by rewriting the information instead of selecting one from the first information or the second information in accordance with the store order information.

4. The branch prediction method according to claim 2, wherein the memory in the branch prediction circuit includes a first memory and a second memory storing the information representing the branch instruction and the branch prediction, wherein the storing the information in the memory includes storing the information in a first memory or a second memory, wherein the rewriting the information in the memory in accordance with a result of determining whether or not a predicted branch has been taken includes rewriting the information in the first memory or in the second memory in accordance with a result of determining whether or not a predicted branch has been taken, and wherein the rewriting the information in the first memory or in the second memory in accordance with a result of determining whether or not a predicted branch has been taken includes alternately selecting between information in the first memory and information in the second memory as the information to be rewritten.

5. The branch prediction method according to claim 2, wherein the memory in the branch prediction circuit includes a first memory and a second memory storing the information representing the branch instruction and the branch prediction, wherein the storing the information in the memory includes storing the information in a first memory or a second memory, wherein the rewriting the information in the memory in accordance with a result of determining whether or not a predicted branch has been taken includes the rewriting the information in the first memory or in the second memory in accordance with a result of determining whether or not a predicted branch has been taken, and wherein the rewriting the information in the first memory or in the second memory in accordance with a result of determining whether or not a predicted branch has been taken includes randomly selecting between information in the first memory and information in the second memory as the information to be rewritten.

* * * * *